United States Patent
Umakhanov et al.

(10) Patent No.: US 9,595,109 B1
(45) Date of Patent: Mar. 14, 2017

(54) DIGITAL CAMERA WITH ORIENTATION SENSOR FOR OPTICAL TRACKING OF OBJECTS

(71) Applicant: Inertial Labs, Inc., Hamilton, VA (US)

(72) Inventors: Ievgenii Umakhanov, Kiev (UA); James Marraccini, Hamilton, VA (US); Anton Struts, Ashburn, VA (US)

(73) Assignee: Inertial Labs, Inc., Hamilton, VA (US)

( * ) Notice: Subject to any disclaimer, the term of this patent is extended or adjusted under 35 U.S.C. 154(b) by 288 days.

(21) Appl. No.: 14/610,627

(22) Filed: Jan. 30, 2015

Related U.S. Application Data

(60) Provisional application No. 61/933,693, filed on Jan. 30, 2014.

(51) Int. Cl.
  *H04N 5/232* (2006.01)
  *G06T 7/00* (2006.01)
  *G09G 5/00* (2006.01)

(52) U.S. Cl.
  CPC ....... *G06T 7/0042* (2013.01); *H04N 5/23296* (2013.01); *G06T 2207/30204* (2013.01); *G06T 2207/30244* (2013.01)

(58) Field of Classification Search
  CPC ......... G06T 7/0042; G06T 2207/30204; G06T 2207/30244; H04N 5/23296
  See application file for complete search history.

(56) References Cited

U.S. PATENT DOCUMENTS

| | | | | |
|---|---|---|---|---|
| 7,388,598 B2 * | 6/2008 | Lee | ........... | H04N 5/232 348/42 |
| 2004/0051680 A1 * | 3/2004 | Azuma | ........... | G03B 13/28 345/8 |
| 2007/0035562 A1 * | 2/2007 | Azuma | ........... | G03B 13/28 345/633 |
| 2007/0139322 A1 * | 6/2007 | Takemoto | ........... | G06F 3/0321 345/87 |
| 2010/0208057 A1 * | 8/2010 | Meier | ........... | G06T 7/0046 348/135 |
| 2010/0265164 A1 * | 10/2010 | Okuno | ........... | G06T 19/006 345/8 |
| 2014/0334668 A1 * | 11/2014 | Saund | ........... | G06T 7/20 382/103 |
| 2015/0042812 A1 * | 2/2015 | Tang | ........... | H04N 5/23206 348/157 |
| 2016/0135762 A1 * | 5/2016 | Mihailescu | ........... | A61B 6/027 600/424 |

* cited by examiner

*Primary Examiner* — Sath V Perungavoor
*Assistant Examiner* — Howard D Brown, Jr.
(74) *Attorney, Agent, or Firm* — Bardmesser Law Group

(57) ABSTRACT

An object tracking system has an inertial orientation sensor attached to a camera. The sensor uses a rigid body position and orientation (with or without markers) visible to the camera for determining the orientation and the position of the object in the global reference frame, when the camera is not rigidly fixed. Another orientation sensor is attached to the object in order to keep tracking of its orientation when a valid tracking of the object cannot be obtained from the camera. The data from the orientation sensor attached to the object and the data from the orientation sensor attached to the camera is used to increase the accuracy of the optical tracking of the object.

19 Claims, 3 Drawing Sheets

DIGITAL CAMERA WITH ORIENTATION SENSOR FOR OPTICAL TRACKING OF OBJECTS

CROSS-REFERENCE TO RELATED APPLICATIONS

This application is a non-provisional of U.S. Provisional Patent Application No. 61/933,693, filed Jan. 30, 2014, incorporated herein by reference in its entirety.

BACKGROUND OF THE INVENTION

Field of the Invention

The present invention is related to optical tracking of an object by a video camera or a video/optical sensor, and more particularly, to a system for determining a global orientation of the video camera, when the camera is not fixed.

Description of the Related Art

Various systems for tracking orientation of a video camera are known. For example, a conventional method of tracking an object uses a rigid body position and orientation tracking of a fixed camera and a plurality of markers (sensors) attached to an object being tracked by the camera. Another conventional method uses orientation tracking by means of recognition of the optical image(s) of the environment of the object being tracked. Yet another conventional approach uses augmenting of the optical orientation in the environment with inertial sensors.

The conventional methods also include:

Optical tracking of an object using additional infrastructure: one or multiple cameras with known fixed positions and orientations in the global reference frame;

Inertial measurement of orientation using accelerometers and/or gyroscopes;

Magnetic compassing to supplement inertial measurement;

Inertial measurement augmented with a gyrocompass instead of a magnetic compass;

Optical recognition of the environment, when the environment is mapped in the global reference frame;

Optical recognition of celestial bodies, which are mapped to the global reference frame using the knowledge of global times, almanacs and ephemerides.

Each of the above methods has its own flaws or limitations. For example, the infrastructure-based optical tracking self-evidently requires the infrastructure. Often, the orientation needs to be estimated without the actual infrastructure available. The inertial sensors (gyroscopes) tend to drift. While the drift is compensated for tilt angles (pitch and roll), yaw angle remains uncompensated, unless supplemented with other means (e.g., magnetic compass, gyrocompass, or optical reference). The magnetic compasses suffer from disturbances, not only from the environment, but from the object itself, if there are ferrous materials, or if electric currents are present, especially variable currents.

Gyrocompasses can only be used on static objects, as they try to measure the Earth's rotation, which is very slow compared to any movement of the object. Optical recognition of the environment features requires for those features to be mapped (recorded) beforehand. Optical recognition of the celestial bodies requires a clear view of the sky, and knowledge of global time and coordinates that are normally obtained using GPS, since the sky is supposed to be visible anyway. Additionally, the optical tracking suffers from marker occlusion, when the constellation cannot be recognized because not all markers are visible to a camera.

Therefore, it is desirable to have an efficient system for tracking objects when the camera is not fixed and the object does not have positional markers attached to it. Accordingly, there is a need in the art for a reliable system and method for tracking objects by using a video camera or other optical sensors.

SUMMARY OF THE INVENTION

The present invention is related to methods for tracking objects, and more particularly, to a system and method for tracking object by a video camera, which is not fixed.

In one aspect of the invention, a system has an inertial orientation sensor attached to a camera. The sensor uses a rigid body position and an orientation (with or without markers) visible to the camera for determining the orientation and the position of the object in the global reference frame, when the camera is not rigidly fixed. An exemplary embodiment combines data from both optical and inertial sensors. A sensor fusion algorithm, see, e.g., http:**en.wikipedia.org/wiki/Sensor_fusion, may be used.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
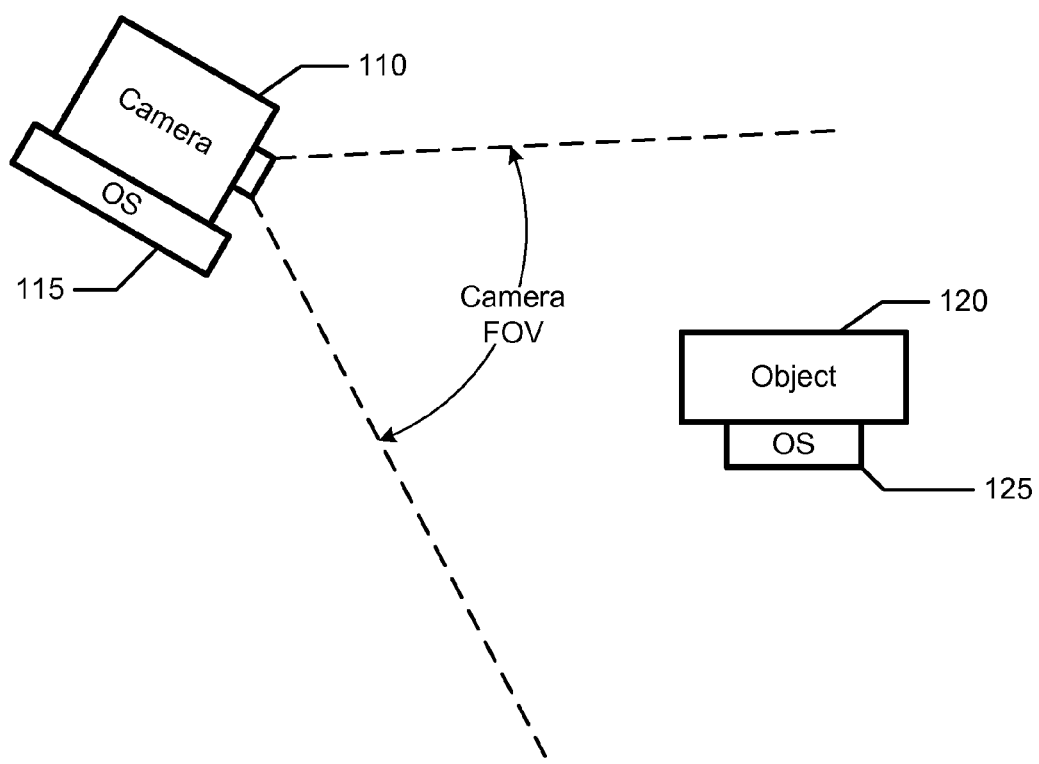
FIG. 1 illustrates a camera with an object to be tracked in its field of view, in accordance with the exemplary embodiment.

Reference will now be made in detail to the preferred embodiments of the present invention, examples of which are illustrated in the accompanying drawings.

In one aspect of the invention, a system has an inertial orientation sensor attached to a camera. The sensor uses a rigid body position and orientation (with or without markers) visible to the camera for determining the orientation and the position of the object in the global reference frame, when the camera is not rigidly fixed.

According to one exemplary embodiment, an (inertial) orientation sensor is attached to the object in order to keep track of its orientation, when a valid tracking of the object cannot be obtained from the camera. According to one exemplary embodiment, the data from the (inertial) orientation sensor, which is mechanically attached to the object and the data from the orientation sensor, which is mechanically attached to the camera, is used to increase the accuracy of the optical tracking of the object. Each of the orientation sensors includes three acceleration sensors (in three axes), three angular rotation rate sensors (in three axes), and three magnetic field sensors (in three axes). Note that a single magnetic field sensor only measures one component of magnetic field vector, i.e., the one along its axis of sensitivity. In a typical scenario, the local magnetic field is not uniform and constant, unlike local gravity. So, tracking the magnetic field may be necessary to check for fluctuations. If fluctuations are detected, the magnetic field sensor cannot be trusted for orientation estimation, because it will give wrong data. Instead, in one of the embodiments, the other sensor's magnetic field sensor are relied upon, where those fluctuations are lower, and the optical link is used to correct the first sensor's orientation.

The data from these sensors is digitized and transferred to the processor using serial or parallel digital signal channels. A computer algorithm, for example, a Kalman filter, or a complementary filter, runs on the processor in order to estimate the sensor orientation in the reference frame defined relative to the Earth surface in a current location, for example, East-North-Up reference frame, using the data from the orientation sensors.

In some cases, an object to be tracked is too small and the processor power is not sufficient for processing optical images of the object's environment. The object can be too dynamic for using gyrocompasses, when it is loosely attached to another mobile object large enough, or inert enough for using the above mentioned driftless orientation tracking methods. In this case, a camera can be attached to the object, effectively building a carry-on infrastructure for tracking the target object optically using the camera. The global orientation of the object is calculated using the global orientation of the camera.

The exemplary embodiment eliminates a need for an infrastructure for the infrastructure-based optical tracking and keeps tracking the object's orientation during periods when no valid solution from the optical system can be obtained. That is, because the filter that estimates orientation from the data from the inertial sensor can provide accurate orientation for relatively short periods of time between two valid solutions (at different times) from the optical system.

The tracking system, in accordance with the exemplary embodiment, is depicted in FIG. 1. The system includes a camera 110, an object 120 to be tracked (with or without markers), an orientation sensor 115 firmly attached to the camera 110, so the orientation of the focal plane in the orientation sensor's reference frame is known and remains constant. An orientation sensor 125 is firmly attached to the object 120, so the orientation of the object in the sensor's reference frame is known and remains constant. If there are markers affixed on the object 120, the coordinates of each marker in the object's reference frame are known and remain constant. Therefore, if there are markers and the orientation sensor attached to the object 120, the coordinates of each marker in the sensor's reference frame are known and remain constant as well.

The optical parameters of the camera 110, including the angular resolution and the geometry of the field of view are known for a particular video camera. The field of view can be adjusted, if distorted, by calibration of the distortion correction values for a particular camera lens using calibration images. An example of the calibration technique can be found in http:**www.vision.caltech.edu/bouguetj/calib-_doc/papers/zhan99.pdf. When the object 120 is visible to the camera 110, an image of it is taken at known moments in time. If the object or the constellation of markers is recognized in the image, its position and orientation can be estimated by applying affine transformation (preserving collinearity and ratios of distances) to the known front view image, to match it with the observed view.

That orientation is expressed in the camera's 110 reference frame. At the same moments, the orientation of the camera 110 in the global reference frame is obtained from the orientation sensor 115 attached to it. That orientation is used to transform the object's position and orientation into the global reference frame. If there is a position sensor attached to the camera, the position of the object is further translated using the data from that sensor. The end result is the orientation data, and, possibly, the position of the object in the global reference frame.

Note that multiple possible orientation solutions for the given observed image of the object can exist. If there is an orientation sensor attached to the object, the orientation data from that sensor can be used to select the most probable solution for the optical orientation. For example, if one of the valid solutions gives the pitch angle P1 and the roll angle R1, and another solution gives P2 and R2, respectively, and the orientation sensor output angles are close to P2 and R2, then the solution giving P2 and R2 is chosen. If the object 120 is not visible to the camera, or cannot be recognized in its current orientation, the orientation sensor attached to the object can be used to keep tracking its orientation in the global reference frame.

Figure 2:
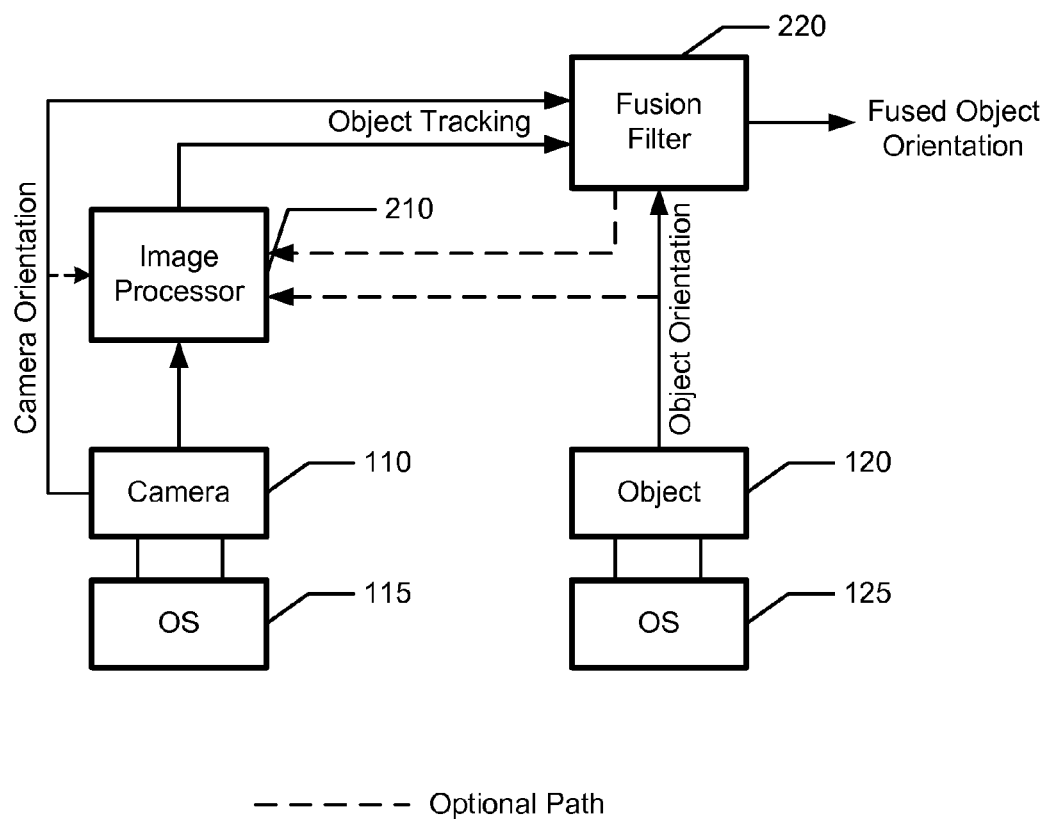
FIG. 2 illustrates an object tracking system, in accordance with the exemplary embodiment.

FIG. 2 illustrates an object tracking system, in accordance with the exemplary embodiment. The camera 110 has the integrated orientation sensor 115. The object 120 to be tracked has the orientation sensor 125. The camera 110 is connected to an image processor 210, such that an image processing algorithm that can be run on a processor embedded into a camera or on a separate computer. It also receives orientation data from the camera orientation sensor and from the object orientation sensor. The image processor is connected to a fusion filter 220. It should be noted that the filter takes pitch and roll data from the inertial sensor on the object and the heading data from the image processor. The fusion filter 220 acquires camera orientation data and receives object tracking data from the camera image processor 210. The fusion filter 220 also receives object orientation data and produces a fused object orientation.

Figure 3:
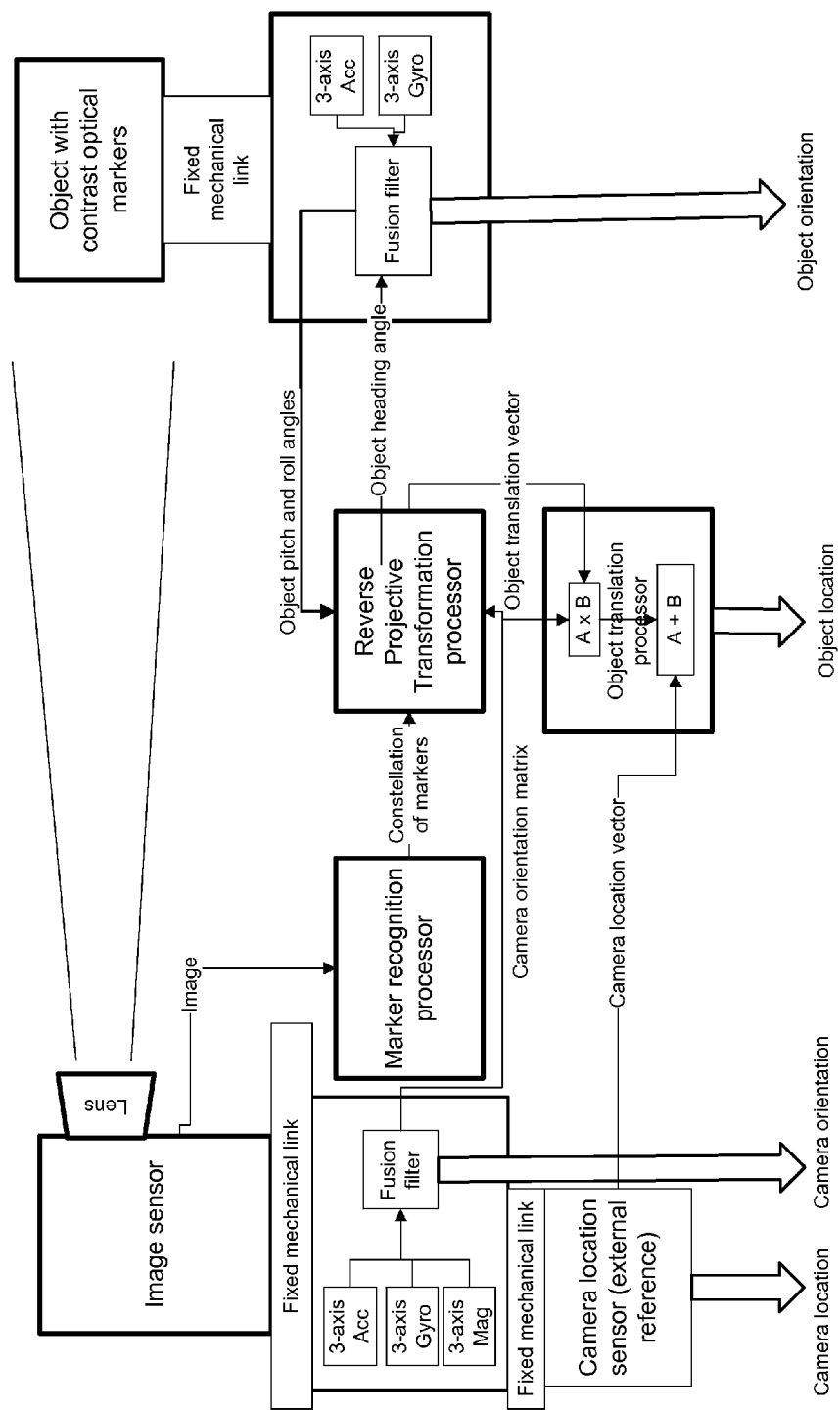
FIG. 3 illustrates a detailed architecture of a tracking system, in accordance with the exemplary embodiment.

FIG. 3 illustrates a detailed architecture of a tracking system, in accordance with the exemplary embodiment. A camera includes a lens attached to an image sensor. An object with contrast optical markers is placed in the field of view of a lens. The markers can be, for example, near-IR LEDs, or black dots on white surface, or white dots on black surface. The image sensor of the camera is mechanically coupled (i.e., fixed) to respective inertial orientation sensors of the camera in such a way that the position and orientation of the image sensor relative to the inertial orientation sensor of the camera remains constant.

Similarly, the position and the orientation of the set of object markers relative to the inertial orientation sensor of the object to which it is mechanically coupled (fixed) remains constant. The fusion filters are computer algorithms running on digital data processors. Those processors are wired or wirelessly connected to the inertial sensors and receive data from them. The camera's fusion filter is wired or wirelessly connected to a camera location sensor (such as a GPS receiver, attached to or part of the camera), which produces camera location data. The fusion filter produces the camera orientation data. The image sensor provides the image data to a marker recognition processor, which provides marker X and Y coordinates in the image and camera orientation matrix to a reverse projective transformation processor, which provides object heading angle to the fusion filter and acquires object pitch and roll angle from the fusion filter attached to the object. The object translation processor receives an object translation vector from the reverse projective transformation processor and calculates object location data. Thus, optical object tracking is provided.

In an alternative embodiment, the orientation of the object can be used together with the orientation obtained from the optical system to produce the fused camera orientation. The system can also be used with decision-making logic based on fluctuations in magnetic field data obtained from the magnetic field sensors, which are part of the orientation sensors attached to the object and to the camera. This would permit selecting whether the optical data will be used to correct the object heading or the camera heading using the method described above. In the decision making logic, the sensor with a larger variance in the magnetic field magnitude is the sensor for which the orientation is corrected by the fusion filter.

As will be appreciated, the processor(s) used to process the data may be integrated into the camera, integrated into the object, or be part of a standalone computing system (e.g., a smartphone, a laptop, etc.).

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A method for optical object tracking, comprising:
   placing an object to be tracked into a field of view of a camera, wherein the camera is not rigidly fixed;
   attaching a first orientation sensor to the camera;
   attaching a second orientation sensor to the object;
   connecting the first and second orientation sensors to a processor for their data to be processed by a sensor fusion algorithm;
   acquiring camera orientation data from the first orientation sensor and object orientation data from the second orientation sensor using a fusion filter;
   producing a fused object orientation data for tracking the object using the fusion filter based on the camera orientation data and the object orientation data; and
   generating an object heading based on the camera orientation data, and object pitch and roll angle from the fusion filter, and marker X and Y coordinates that are identified based on the image sensor of the camera.

2. The method of claim 1, further comprising calculating a global orientation of the object based on a global orientation of the camera.

3. The method of claim 1, further comprising estimating an orientation of the object when the object is out of sight of the camera.

4. The method of claim 1, further comprising placing markers on the object and estimating an orientation of the object using the markers.

5. The method of claim 1, further comprising adjusting a field of view of the camera to compensate for distortion.

6. The method of claim 1, further comprising applying an affine transformation to an image of the object to determine a position and fused object orientation data of the object.

7. The method of claim 1, further comprising selecting one solution out of multiple solutions for the fused object orientation data.

8. The method of claim 1, further comprising using the second orientation sensor to track the object in a global reference frame when the object is not visible to the camera.

9. The method of claim 1, further comprising using the pitch and roll data and the object heading as input for the fusion filter.

10. The method of claim 1, further comprising placing optical markers on the object.

11. The method of claim 1, wherein position and orientation of the image sensor of the camera relative to an inertial sensor of the object orientation sensor remains constant.

12. The method of claim 1, wherein position and orientation of a set of object markers relative to an inertial sensor of the object orientation sensor remains constant.

13. The method of claim 1, wherein an object translation vector is received from the reverse projective transformation processor for calculating object location data.

14. The method of claim 1, wherein the orientation of the object is used together with the orientation obtained from the camera to produce a fused camera orientation.

15. The method of claim 1, wherein fluctuations in magnetic field data obtained from magnetic field sensors included in the second orientation sensor and the fluctuations are used to select whether optical data will be used to correct the object heading or a camera heading.

16. A system for optical object tracking, comprising:
   a camera that is not rigidly fixed and is aimed at an object located in a field of view of the camera;
   a first orientation sensor attached to the camera;
   a second orientation sensor attached to the object;
   a fusion filter configured to receive camera orientation data from the first orientation sensor and object orientation data from the second orientation sensor,
   wherein the fusion filter produces fused object orientation data for tracking the object based on the camera orientation data and the object orientation data, and wherein a reverse projective transformation processor generates an object heading based on the camera orientation data, and object pitch and roll angle from the fusion filter, and marker X and Y coordinates that are identified based on the image sensor of the camera.

17. The system of claim 16, wherein the first orientation sensor includes three accelerometers for generating acceleration data in three axes, three angular rotation sensor for generation angular rotation data in three axes, and a magnetic field sensor.

18. The system of claim 17, wherein the second orientation sensor includes three accelerometers for generating acceleration data in three axes, three angular rotation sensor for generation angular rotation data in three axes, and a magnetic field sensor.

19. The system of claim 18, further comprising a GPS receiver affixed to or integrated into the camera, the GPS receiver providing location data to the fusion sensor.

* * * * *